United States Patent [19]

Liu

[11] Patent Number: 5,473,515
[45] Date of Patent: Dec. 5, 1995

[54] PHOTO-COUPLED CONTROL APPARATUS FOR VEHICLE AUXILIARY LIGHTING

[75] Inventor: Edward Liu, Taipei, Taiwan

[73] Assignee: Young Deer Enterprise Co. Ltd., Taiwan

[21] Appl. No.: 355,185

[22] Filed: Dec. 8, 1994

[51] Int. Cl.$^6$ ..................................................... B60Q 1/06
[52] U.S. Cl. ..................... 362/80.1; 362/83.3; 362/276; 362/802
[58] Field of Search ........................ 362/83.3, 80, 80.1, 362/276, 802, 61; 315/150, 149, 159

[56] References Cited

U.S. PATENT DOCUMENTS

| | | | |
|---|---|---|---|
| 5,036,437 | 7/1991 | Macks | 362/276 X |
| 5,149,187 | 9/1992 | Matsuno | 362/276 X |
| 5,193,894 | 3/1993 | Lietar | 362/276 X |
| 5,195,813 | 3/1993 | Brown | 362/61 |

Primary Examiner—Ira S. Lazarus
Assistant Examiner—Thomas M. Sember
Attorney, Agent, or Firm—Michael D. Bednarek; Marks & Murase

[57] ABSTRACT

A photo-coupled control apparatus for vehicle auxiliary lighting system comprises a combination of a photo coupling set. The set includes a control light emitter assembly and a control light sensor assembly. The control light emitter assembly is attached to the interior surface of the windshield of the vehicle, and has a light emitting device for emitting light signals. The control light sensor assembly is attached to the exterior surface of the windshield at a location opposite the location of the control light emitter assembly across the windshield, and has a light sensing device for receiving the light signals emitted by the light emitting device of the control light emitter assembly. A switch is connected to an electrical power source for providing electric power to the light emitting device of the control light emitter assembly when the switch is turned on for emitting the light signals. A control module is coupled to the control light sensor assembly, the battery of the vehicle, and the lamps of the auxiliary lighting systems. When the switch is turned on, the light emitting device of the control light emitter assembly emits the light signals so as to be received by the light sensing device of the control light sensor assembly, and the control light sensor assembly issues a control signal to the control module upon receiving the light signals, whereby the control module providing electric power of the battery of the vehicle to the lamps of the auxiliary lighting system for turning on the lamps.

8 Claims, 3 Drawing Sheets

PHOTO-COUPLED CONTROL APPARATUS FOR VEHICLE AUXILIARY LIGHTING

BACKGROUND OF THE INVENTION

1. Field of the Invention

The present invention relates in general to photocoupled control apparatus for auxiliary lighting system for vehicles. In particular, the present invention relates to photo-coupled control apparatus employing light signal-coupling for the control of the auxiliary lightings of vehicles.

2. Technical Background

Auxiliary lightings for vehicles, for example, over-roof, frame-mount, or bumper-attached auxiliary lighting lamp arrays of different variety including, such as, fog lamps, utility lamps, and driving lamps, are generally installed as optional equipments for vehicles such as pick-up trucks, or jeeps, etc. These exteriorly mounted auxiliary lighting systems are not standard to the vehicles manufactured by car makers, but are rather added to the vehicle by the vehicle owner's selection, at some time after the vehicle is purchased.

For the installation of the added auxiliary lighting system, although the electrical power wiring are not required to go into the driver's cab for access when used, however, the wiring for the control of the added lighting system, for example, at least the control wiring for basic turning on and off of the lighting system must be led into the cab so that the controlling switches can readily and conveniently be within reach of the driver when the vehicle is driving along. For this requirement, a few control wirings must therefore go through the firewall that separates the driver's cab from the engine compartment, from the control unit of the added auxiliary lighting system, which is normally located in the engine compartment, to the control switches in the driver's cab.

Electrical wiring for the conventional auxiliary lighting systems involved in their installation therefore frequently requires laborious effort. This is primarily because of the fact that modern vehicles are designed with compact engine compartment, the firewall standing between the engine compartment and the driver's cab of the vehicle is well crowded with the various components that must run through the firewall. It is generally difficult to locate freely accessible holes on the firewall to arrange the necessary wiring.

On the other hand, the dashboard of a modern vehicle is also frequently crowed, with little space left for the installation of additional switches for the added auxiliary lighting system. Even if spare switch locations are available on the dashboard, they are always not easy for direct access for installation of the added switches.

In general, obvious method of adding exterior auxiliary lighting system to a vehicle involves the installation of some electrical wiring from the engine compartment to the driver's cab. A penetration of the wires through the firewall would be necessary if hard wiring of the control of the added lighting system is intended.

To avoid the problem described above, P. K. Brown proposed a wireless control for these added auxiliary lighting systems in the U.S. Pat. No. 5,195,813, titled "Wireless control for auxiliary lighting", issued Mar. 23, 1993. In Brown's disclosure, a very low power transmitter located in the driver's cab transmits simple or encoded signals to a receiver included in the control module of the added lighting system, so that the control instructions of the lighting system can be decoded to facilitate control accordingly. Although such implementation of lighting control avoids the requirement for any control wiring to actually go through the firewall, however, the radio transmitter/receiver pair still involves relatively much higher costs than the hard wired implementation.

SUMMARY OF THE INVENTION

It is therefore an object of the present invention to provide a photo-coupled control apparatus for auxiliary lighting system for vehicles that eliminates the requirement for any control hard wiring to go through the firewall of the vehicle.

It is another object of the present invention to provide a photo-coupled control apparatus for auxiliary lighting system for vehicles that is easy to install while low in cost.

The present invention achieves the above indicated objects by providing a photo-coupled control apparatus for vehicle auxiliary lighting system allowing wireless coupling of the components of the auxiliary lighting system inside the driver's cab of the vehicle to the components of the system that are located inside the engine compartment. The photo-coupled control apparatus for vehicle auxiliary lighting system comprises a combination of photo coupling set. The set includes a control light emitter assembly and a control light sensor assembly. The control light emitter assembly is attached to the interior surface of the windshield of the vehicle, and has a light emitting device for emitting light signals. The control light sensor assembly is attached to the exterior surface of the windshield at a location opposite the location of the control light emitter assembly across the windshield, and has a light sensing device for receiving the light signals emitted by the light emitting device of the control light emitter assembly. A switch is connected to a dry battery or storage battery for providing electric power to the light emitting device of the control light emitter assembly when the switch is turned on for emitting the light signals. A control module is coupled to the control light sensor assembly, the battery of the vehicle, and the lamps of the auxiliary lighting systems. When the switch is turned on, the light emitting device of the control light emitter assembly emits the light signals for receiving by the light sensing device of the control light sensor assembly, and the control light sensor assembly issues a control signal to the control module upon receiving the light signals, whereby the control module providing electric power of the battery of the vehicle to the lamps of the auxiliary lighting system for lighting on the lamps.

BRIEF DESCRIPTION OF THE DRAWING

Other objects, features and advantages of the present invention will become apparent by way of the following detailed description of the preferred but non-limiting embodiment. The description is made with reference to the accompanied drawings, wherein:

FIG. 4 shows the light sensor assembly of the photo coupling device employed in the photo-coupled control of

FIG. 1; and

DETAILED DESCRIPTION OF THE PREFERRED EMBODIMENT

Figure 1:
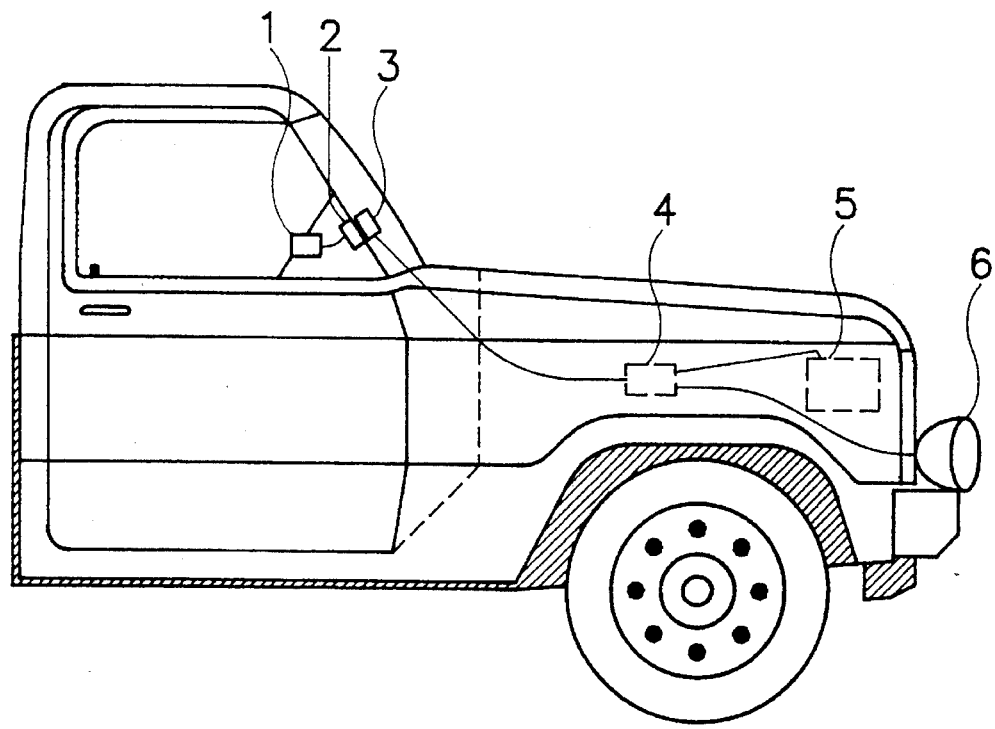
FIG. 1 schematically shows the photo-coupled control for auxiliary lighting of vehicle in accordance with a preferred embodiment of the present invention.

Refer to FIG. 1 of the drawing. FIG. 1 schematically shows the photo-coupled control for auxiliary lighting of vehicle in accordance with a preferred embodiment of the present invention. The auxiliary lighting system employing the photo-coupled control of the present invention may include a control switch 1, located by means of, such as, attaching by adhesive, at a suitable location on the dashboard that can be reached by the driver of the vehicle when needed. A control light emitter assembly 2 is connected to the control switch 1 may be attached to the interior surface of the windshield. A corresponding control light sensor assembly 3 is likewise also attached to the windshield, but is on the exterior surface, at a location opposite the control light emitter assembly 2. The locations of the control light emitter and sensor assembly-pair are such that the two can face each other across the layer of windshield glass, while the light sensor assembly 3 not constituting an obstacle for the windshield wiper swing. Control wiring of the control light sensor assembly 3 then leads to a control module 4, which is responsible for receiving the control instructions issued by the driver in the driver's cab, and transmitted via the photocoupling between the control light emitter/sensor assemblies 2 and 3, for the actuation of the lamps 6 of the auxiliary lighting system.

As is observed in FIG. 1, the control module 4, receiving the control instructions, directly controls the power to the lamp 6 of the added auxiliary lighting system, as provided by the battery 5, or the electrical power generation system of the vehicle. The headlight of the vehicle (not shown in the drawing) may also be subjected to the control of the control unit of the added auxiliary lighting system. This is because there are occasions when the headlight might be needed for utilization together with the auxiliary light lamps. It should, however, be noticed that the headlight control, as may be involved in the utilization of the auxiliary lightings, must comply with the traffic regulations. For example, it may be required by the regulation that the headlight of a vehicle must not be replaced by the added auxiliary driving light.

When the utilization of the auxiliary light is intended, the driver of the vehicle may actuate the switch 1 located conveniently within reach, on the dashboard as described above. The control light emitter assembly 2 sends out a series of light signals based on the driver's switch instructions which are picked up by the control light sensor assembly 3 located at a corresponding receiving position just across the transparent glass windshield. The control light sensor assembly 3, upon receiving the control signals, decodes and actuates the control module 4, so that the lamps 6 of the added auxiliary lighting system can be controlled in the way desired.

Figure 2:
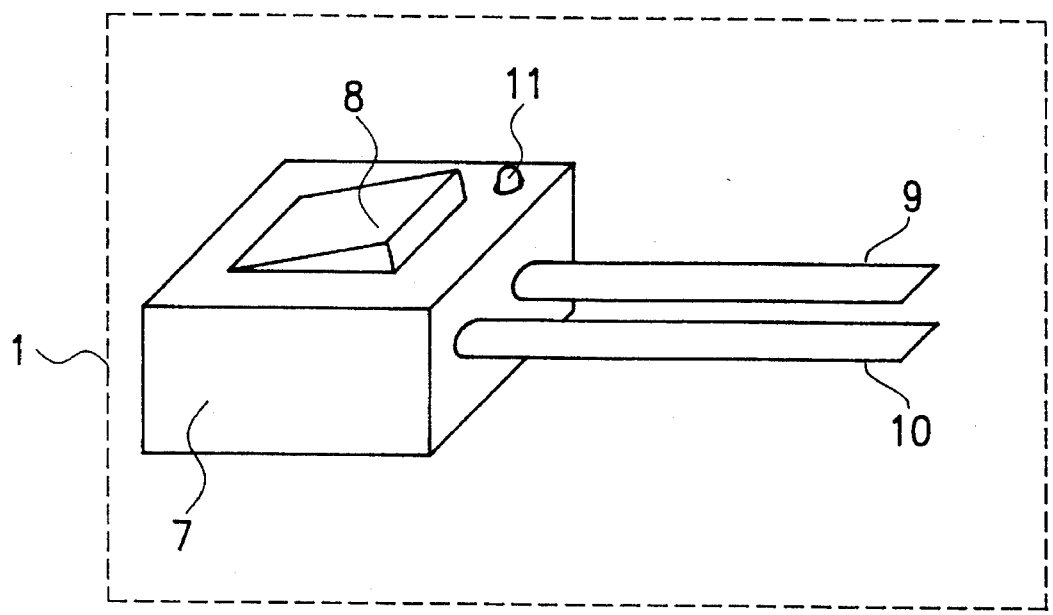
FIG. 2 shows a perspective view of a switch employed in the photo-coupled control of FIG. 1.

FIG. 2 of the drawing shows a perspective view of the switch 1 employed in the photocoupled control system of FIG. 1. As shown in the drawing, the switch 1 may be a rectangular body 7 housing a lever switch 8. Although more complicated multi-switch control can be utilized to facilitate the multi-function control of the added auxiliary lighting system, for the purpose of clarity of the description, in this exemplified embodiment, the switch is a simple on-off control switch. A light status indicator 11, which can be a small incandescent lamp, or an LED, can be incorporated to indicate the electric power of the dry battery or storage battery which is connected to the switch, when the switch is turned on. A pair of switch lead wires 9 and 10 is provided which can be connected to the control light emitter assembly 2 of FIG. 1 for actuating the control of the auxiliary lighting system.

Figure 3:
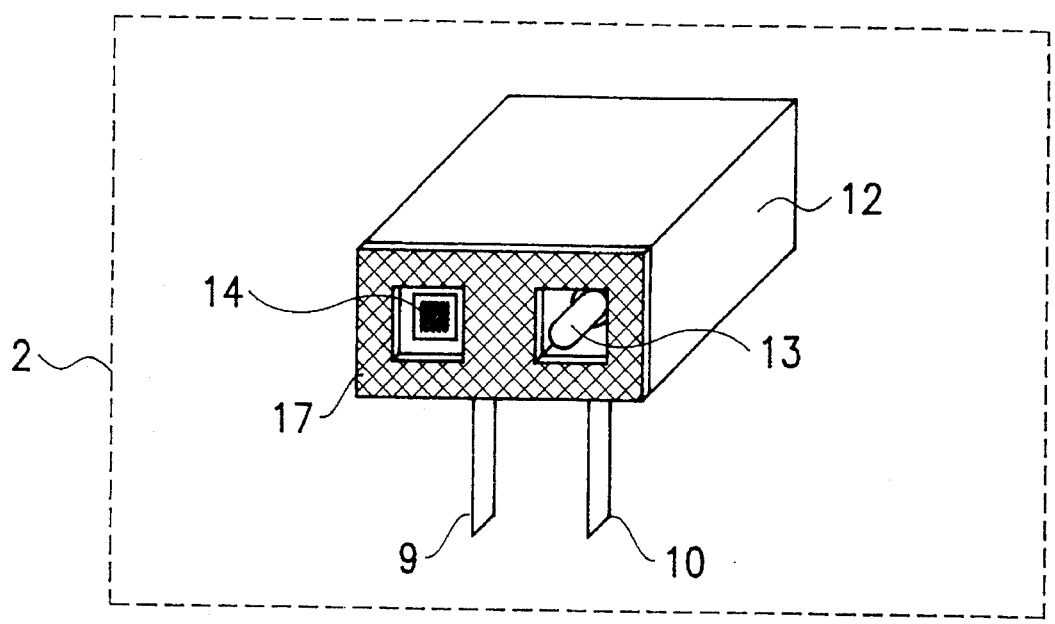
FIG. 3 shows the light-emitting assembly of the photo coupling device employed in the photo-coupled control of FIG. 1.

FIG. 3 of the drawing shows the control light-emitting assembly 2 of the photo coupling device employed in the photo-coupled control of FIG. 1. The control light-emitting assembly 2 comprises a light emitter body 12, which is a generally rectangular block body containing a light emitter 13, a focusing lens 14, and a pair of switch lead 9 and 10. The surface of the generally rectangular block body 12 where the light emitter 13 emits its control light signals is provided with a layer of double-faced adhesive tape 17. As can be observed in the drawing, the layer of double-faced adhesive tape 17 is provided with two openings so that the light emitter 13 and the focusing lens 14 are not obstructed when the control light emitter assembly 2 is attached to the interior surface of the windshield of the vehicle.

The light emitter 13 can be an LED, a laser diode, an infra-red LED, or incandescent lamp, capable of sending out the control signals in terms of light pulses. In the exemplified embodiment for the description of the present invention, an LED is used. The focusing lens 14 is utilized to focus the light emitted by the LED 19 of the light sensor assembly 3 of FIG. 4, indicating to the driver of the vehicle that the auxiliary light is indeed turned on.

The pair of switch leads 9 and 10 are used to connect to the switch 1, for actuating the auxiliary lighting system under the control of the driver of the vehicle. When the lever switch 8 is switched on, the light emitter 13 is then turned on, emitting a light signal that can be coupled to the control light sensor assembly 3 for actuating the control module 4, in order that the lamp 6 of the auxiliary lighting system can be turned on. When the lamp 6 is actually turned on, the control module 4 of FIG. 5 can turn on the LED 19 of the control light sensor assembly 3, its lighting can be observed by the focusing lens 14, which accumulates the light and lit up itself, constituting an indication the actual status of the lamp 6. On the other hand, when the lever switch 8 is turned off, the lamp 6 will be shut off as a result, the control module 4 of the FIG. 5 can turn off the LED 19 of the control light sensor assembly 3, and the focusing lens 14 would not lit on, allowing the driver to make sure that the lamp 6 is turned off. As a general rule, it is a better practice for the driver of a vehicle not to move his sight away from the road conditions while driving. The provision of the focusing lens 14 can serve as a check source for the status of the lamp 6 without the need for the driver to remove his eye sights away from the road.

Figure 4:
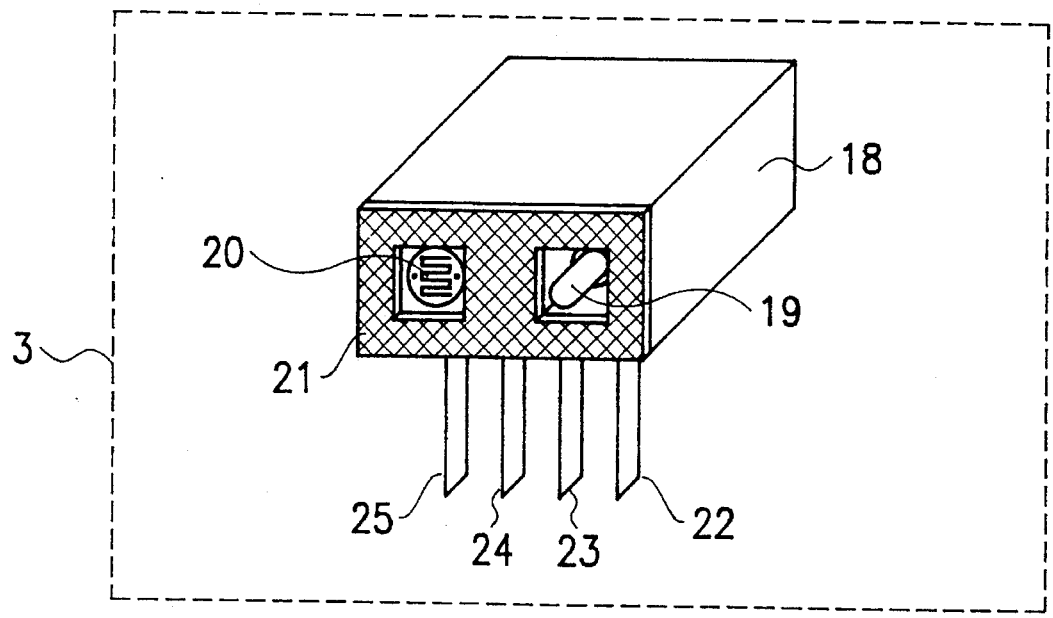

Refer next to FIG. 4 of the drawing. FIG. 4 shows the light sensor assembly 3 of the photo coupling device employed in the photo-coupled control of FIG. 1. As is seen in the drawing, the control light sensor assembly 3 comprises a light sensor body 18 (which, like the light emitter body 12 of the control light emitter assembly 2, is also a generally rectangular block body) containing an LED 19, a photo sensor 20, a pair of LED lead wires 22 and 23, and a pair of control wires 24 and 25. The surface of the generally rectangular block body 18 where the light sensor 20 receives its control light signals is provided with a layer of double-faced adhesive tape 21. As can be observed in the drawing, the layer of double-faced adhesive tape 21 is provided with two openings so that the light sensor 20 and the LED 19 are not obstructed when the control light emitter assembly 3 is attached to the exterior surface of the windshield of the vehicle. It should be noticed that the light sensor body 18 for the control light sensor assembly 3 must be hermetically sealed since it is normally attached to the exterior surface of the windshield. The components installed inside the light sensor body 18 must be protected from the water of either rain or car wash to avoid malfunctioning of the entire system.

The light sensor 20 can be a photoresistor, a photodiode, or a phototransistor, capable of receiving signals sent in light pulses and converting into electrical signals. In the exemplified embodiment of the description of the present invention, a photoresistor is used. The LED 19 is utilized to send a light-on condition of the auxiliary lighting system to the driver of the vehicle via the focusing lens 14 of the control light emitter assembly 2 as described above. For these purpose, the control light sensor assembly 3, when attached to the exterior surface of the windshield of the vehicle, must be aligned with the control light emitting assembly 2. The alignment requires that the signal light emitting LED 13 of the assembly 2 must be at the opposite position of the photo sensor 20 of the assembly 3 across the windshield glass, and the focusing lens 14 of the assembly 2 must be at the opposite position of the LED 19 of the assembly 3 across the windshield glass. Further, as already indicated above, the aligned pair of assemblies 2 and 3 must have the control light sensor assembly 3 located at a position of the exterior surface of the windshield avoiding the swing area of the windshield wiper.

When the LED 13 of the control light emitter assembly 2 is energized to glare by the activation of the switch 1 as turned on by the driver of the vehicle, the photo sensor 20 of the control light sensor assembly 3 which is located directly opposite across the windshield glass can then pick up the light signal, and relay the signal via the pair of control wires 24 and 25 to the control module 4 of the auxiliary lighting system. The control module 4 can then turn on the lamp 6 of the auxiliary lighting system accordingly. On the other hand, if the LED 13 is turned off as the driver switches off the switch 1, the lamp 6 will be shut off since the photo sensor 20 would no longer be receiving the light signal from the LED 13. The auxiliary lighting system can therefore be turned on and off at the driver's will, via the photo coupling between the control light emitter and sensor assemblies 2 and 3, without requiring physical connection that must go from inside the engine compartment to inside the driver's cab.

When the auxiliary lighting system is turned on, the control module 4 can turn on the LED 19 of the control light sensor assembly 3 via the pair of LED lead wires 22 and 23, so that the focusing lens 14 of the control light emitter assembly 2 can gather the LED glare to provide, directly on the windshield, a visual indication that the auxiliary lighting system is turned on. This visual indication resembles a head-up display of the status of the auxiliary lighting system.

The pair of switch leads 9 and 10 are used to connect to the switch 1, for actuating the auxiliary lighting system under the control of the driver of the vehicle. When the lever switch 8 is switched on, the light emitter 13 is then turned on, emitting a light signal that can be coupled to the control light sensor assembly 3 for actuating the control module 4, in order that the lamp 6 of the auxiliary lighting system can be turned on. When the lamp 6 is actually turned on, the control module 4 of FIG. 5 can turn on the LED 19 of the control light sensor assembly 3, its lighting can be observed by the focusing lens 14, which accumulates the light and lit up itself, constituting an indication the actual status of the lamp 6. On the other hand, when the lever switch 8 is turned off, the lamp 6 will be shut off as a result, the control module 4 of the FIG. 5 can turn off the LED 19 of the control light sensor assembly 3, and the focusing lens 14 would not lit on, allowing the driver to make sure that the lamp 6 is turned off. As a general rule, it is a better practice for the driver of a vehicle not to move his sight away from the road conditions while driving. The provision of the focusing lens 14 can serve as a check source for the status of the lamp 6 without the need for the driver to remove his eye sights away from the road.

Figure 5:
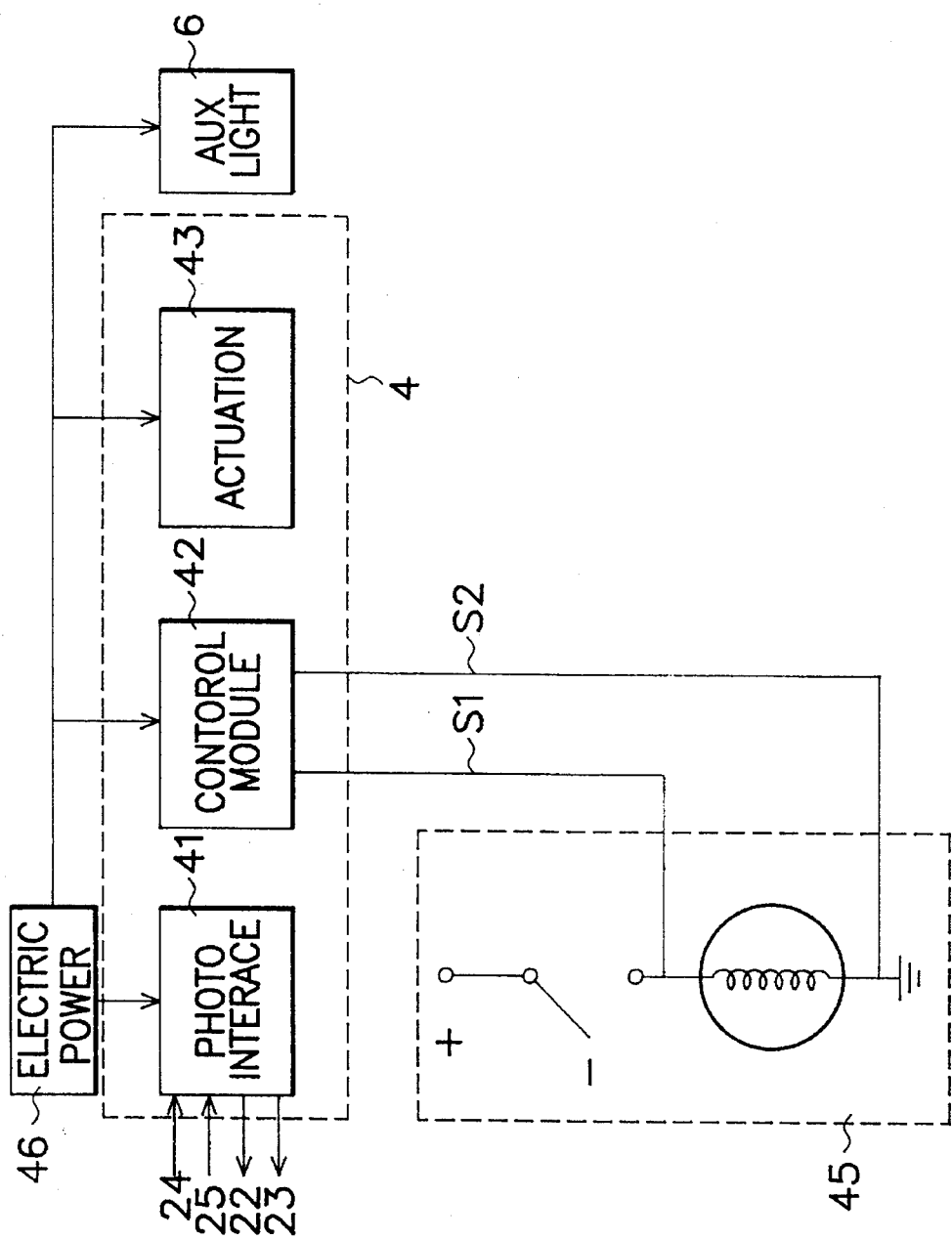
FIG. 5 shows a block diagram of the photo-coupled control of FIG. 1.

FIG. 5 shows a block diagram of the photo-coupled control system of FIG. 1 as may be implemented in a typical vehicle. The system may comprise the control module 4, the power unit 46, the lamp 6 of the auxiliary lighting system, the control light sensor assembly 3, the control light emitter assembly 2, and the switch 1. As shown in the drawing, only the control module 4, the lamp 6, the power unit 46 are shown. Based on the above descriptions, only the control module 4 and the power unit 46 are located in the engine compartment. The lamp 6 may be, for example, on the front bumper of the vehicle. The other components not shown in the drawing, namely the control light sensor assembly 3 is on the exterior surface of the windshield, while the control light emitter assembly 2 and the switch are in the driver's cab.

The control module 4, as indicated by the dashed line in the drawing, may be contained in a proper container fixed to a suitable location in the engine compartment. The control module 4 may comprise a light sensor electronic interface 41, a control unit 42, and an actuation unit 43. The power unit 46, which is the power of the vehicle battery after being regulated, feeds electrical power to the three units 41, 42 and 43 of the control module 4. The power unit 46 also supplies power to the lamp 6 of the auxiliary lighting system.

The light sensor electronic interface 41 is directly connected to the control wires 24 and 25, as well as the LED lead wires 22 and 23. When the photo sensor 20 of the control light sensor assembly 3 picks up the light signal as sent by the LED 13 of the control light emitter assembly 2 and relay the signal to the light sensor electronic interface 41 via the pair of control wires 24 and 25, the light sensor electronic interface 41 can send a signal to the control unit 42 indicating that the driver has turned on the switch, an intention to turn on the auxiliary lighting system is given. When the lamp 6 of the auxiliary lighting system is turned on, the light sensor electronic interface 41 will turn on the LED 19 of the control light sensor assembly 3 via the pair of LED lead wires 22 and 23, and the glare of the LED 19, as described above, will provide a visual indication to the driver through the focusing lens 14 of the control light emitter assembly 2.

As is seen in FIG. 5, the control unit 42 is also connected to a pair of high and low beam sense lines S1 and S2 that are connected to the headlight circuitry 45 of the vehicle. When the control unit 42 receives the signal sent by the light sensor electronic interface 41 as described above, the status of the headlight circuitry 45 will be examined as well, in order to review of the lighting status of the headlight as to whether the headlight is turned on to the high or low beam status via the pair of sense lines S1 and S2. The result of the comparison is sent further to the actuation unit 43.

The actuation unit 43, upon receiving the comparison result as sent over by the control unit 42, performs a comparison to decide whether or not the lamp 6 of the auxiliary lighting system is allowed to turn on. This arrangement is to allow the use of the added auxiliary lighting system to comply with the local traffic regulations. As mentioned above, some of the local traffic regulations require that the auxiliary driving light must be turned on only when the headlight of the vehicle is turned on simultaneously. For example, as per certain traffic regulations, if the headlight of the vehicle is not turned on, the turning on of the switch 1 of the auxiliary lighting system is not allowed to directly turn on the lamp 6 of the auxiliary lighting system. On the other hand, in occasions wherein no particular traffic regulation is to comply, the lamp 6 of the auxiliary lighting system can be turned on and off directly under control of switch 1. The lighting on of the lamp 6 is controlled by amplifying the comparison result signal as issued by the control unit 42, in a manner known in the art, for example, the amplified signal may be utilized to drive a solenoid of a relayed switch, which controls the on and off the lamp 6 of the auxiliary lighting system.

The following is an exemplified scheme employed by the control module 4 to control the lighting of the lamp 6 of the auxiliary lighting system wherein the status of the headlight of the vehicle is examined for the consideration of whether or not the auxiliary lighting system should be turned on:

(1) The photo sensor 20 of the control light sensor assembly 3 receives a light signal having sufficient intensity that can be relayed back to the light sensor electronic interface 41 for issuing a control signal to the control unit 42.

(2) The control unit 42 detects the high or low beam status of the headlight circuitry 45 of the vehicle via the pair of high and low beam sense lines S1 and S2.

(3) The control unit 42 issues a turning on signal to the actuation unit 43 if both the conditions in steps (1) and (2) are true, allowing the actuation unit 43 to turn on the lamp 6 of the auxiliary lighting system by, for example, amplifying a turn on signal that can be utilized to drive the solenoid of a relayed switch that supplies power to the lamp 6.

In the exemplified embodiment of the present invention as described above, the reference to the status of the headlight of the vehicle is a factor for deciding the turning on or off of the auxiliary light system. In the embodiment of FIG. 5, the auxiliary lighting system is to comply with the traffic regulation that the auxiliary lighting system must be turned on only when the headlight of the vehicle is already turned on, either in their high or low beam status.

The above-described preferred embodiment of the present invention is utilized only for the purpose of the description of the present invention. Persons skilled in this art can appreciate the fact that other similar arrangements can be devised from the embodiments disclosed above without departing from the spirit of the present invention, which is recited in the claims that follows. For example, the photo-coupled control apparatus can also incorporate a power level detection means for detecting the power level status of the battery of the vehicle. If the vehicle auxiliary light system was utilized as a utility lighting system on a working site, the detection means can urge the driver to start the engine of the vehicle to charge the battery, thereby preventing over-discharge of the battery. Moreover, as another example, if the auxiliary lighting system is used as the utility light on a work site, it may be un-necessary for the headlight to be turned on simultaneously. The detection means can acknowledge the condition and allows the headlight of the vehicle to be turned off.

I claim:

1. A photo-coupled control apparatus for vehicle auxiliary lighting system, comprising:

a combination of a photo coupling set includes a control light emitter assembly and a control light sensor assembly, said control light emitter assembly being attached to a location on a surface of a windshield of said vehicle and having a light emitting device for emitting light signals, and said control light sensor assembly being attached to an outer surface of said windshield at a location opposite the location of said control light emitter assembly across said windshield and having a light sensing device for receiving said light signals emitted by the light emitting device of said control light emitter assembly;

a switch connected to a battery of said vehicle for providing electric power to said light emitting device of said control light emitter assembly, whereby turning on of said switch emits said light signals; and a control module coupled to said control light sensor assembly, the battery of said vehicle, and lamps of said auxiliary lighting systems, upon turning on of said switch, said light emitting device of said control light emitter assembly emits said light signals so as to be received by the light sensing device of said control light sensor assembly, said control light sensor assembly issuing a control signal to said control module upon receiving said light signals, whereby said control module providing electric power of said battery to said lamps of said auxiliary lighting system for turning on of said lamps.

2. The photo-coupled control apparatus for vehicle auxiliary lighting system of claim 1, wherein said control light sensor assembly further comprises a light indicating device, said light indicating device emitting light when said lamps of said auxiliary lighting system is turned on, and wherein said control light emitter assembly further comprises a focusing lens enclosed inside an enclosing housing for focusing the light emitted by said light indicating device.

3. The photo-coupled control apparatus for vehicle auxiliary lighting system of claim 1, wherein the location where said control light sensor assembly is attached to the outer surface of the windshield of said vehicle is outside a swing area of a pair of windshield wipers of said vehicle.

4. The photo-coupled control apparatus for vehicle auxiliary lighting system of claim 1, wherein said control light emitter assembly and said control light sensor assembly are attached to the inner and outer surfaces of said windshield respectively by double-faced adhesive tapes.

5. The photo-coupled control apparatus for vehicle auxiliary lighting system of claim 1, wherein said light sensing device of said control light sensor assembly is a photoresistor.

6. The photo-coupled control apparatus for vehicle auxiliary lighting system of claim 1, wherein said light sensing device of said control light sensor assembly is a photodiode.

7. The photo-coupled control apparatus for vehicle auxiliary lighting system of claim 1, wherein said light sensing device of said control light sensor assembly is a phototransistor.

8. The photo-coupled control apparatus for vehicle auxiliary lighting system of claim 1, wherein said control module further comprises a sensing means for sensing the status of a headlight of said vehicle for enabling turning on of said lamps of said auxiliary lighting system if and only if said headlight is sensed to be in a turned-on status, either in a high or low beam status.

* * * * *